United States Patent
Nagata et al.

(10) Patent No.: US 11,966,861 B2
(45) Date of Patent: Apr. 23, 2024

(54) OPERATION PLANNING SYSTEM AND OPERATION PLANNING METHOD

(71) Applicant: TOYOTA JIDOSHA KABUSHIKI KAISHA, Toyota (JP)

(72) Inventors: Yu Nagata, Tokyo (JP); Toshihiro Nakamura, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/507,117

(22) Filed: Oct. 21, 2021

(65) Prior Publication Data

US 2022/0188710 A1 Jun. 16, 2022

(30) Foreign Application Priority Data

Dec. 16, 2020 (JP) .................. 2020-208688

(51) Int. Cl.
*G06Q 10/02* (2012.01)
(52) U.S. Cl.
CPC .................... *G06Q 10/02* (2013.01)
(58) Field of Classification Search
CPC ............... G06Q 10/02; G06Q 10/0637; G06Q 10/06315; G06Q 50/30
See application file for complete search history.

(56) References Cited

U.S. PATENT DOCUMENTS

| | | | |
|---|---|---|---|
| 2011/0246252 A1 | 10/2011 | Uesugi | |
| 2014/0217976 A1* | 8/2014 | McGrath | B60L 15/2045 320/109 |
| 2015/0006002 A1* | 1/2015 | Yamane | G06Q 50/30 701/22 |
| 2015/0199619 A1 | 7/2015 | Ichinose et al. | |
| 2017/0246962 A1* | 8/2017 | Weber | B60L 53/12 |
| 2019/0126766 A1* | 5/2019 | Taguchi | B60L 53/36 |
| 2020/0279195 A1 | 9/2020 | Kobori et al. | |

FOREIGN PATENT DOCUMENTS

| | | | |
|---|---|---|---|
| JP | 2011-253257 A | 12/2011 | |
| JP | 2012073979 A * | 4/2012 | |
| JP | 2013-90359 A | 5/2013 | |
| WO | 2014/024254 A1 | 2/2014 | |
| WO | WO-2015049969 A1 * | 4/2015 | ............ B60L 11/182 |
| WO | 2019/106745 A1 | 6/2019 | |

OTHER PUBLICATIONS

Simone Orcioni, Electric Vehicles Charging Reservation Based on OCPP, 2018, p. 1-3 (Year: 2018).*

* cited by examiner

*Primary Examiner* — Ibrahim N El-Bathy
(74) *Attorney, Agent, or Firm* — Sughrue Mion, PLLC

(57) ABSTRACT

An operation planning system that creates an operation plan of a vehicle with a rechargeable battery as a travel energy source includes: a reception unit configured to receive request information including a departure location and a destination from a user; and an operation determining unit configured to determine an operation plan in response to the request information. The operation determining unit is configured to derive a state of charge shortage by which there is a shortage when the vehicle travels in an operation section based on the state of charge of the vehicle and to create the operation plan by allocating a vehicle, which is able to be charged with the derived state of charge shortage until an operation of the vehicle starts, to the operation section.

7 Claims, 8 Drawing Sheets

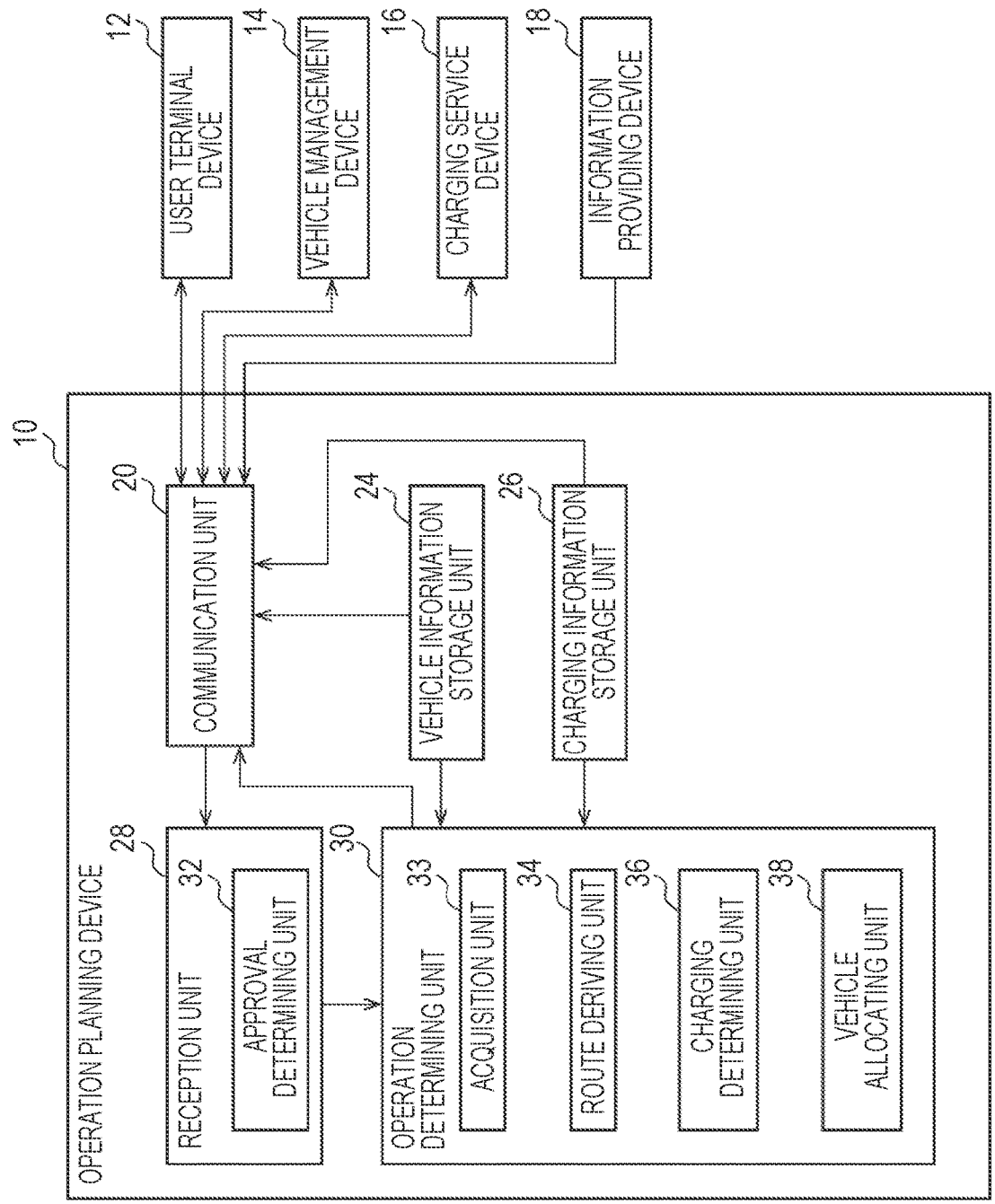

FIG. 3A

| USER ID | DEPARTURE LOCATION INFORMATION | DESTINATION INFORMATION | DESIRED DATE AND TIME INFORMATION |
|---|---|---|---|

FIG. 3B

| VEHICLE ID | POSITION INFORMATION | CHARGEABILITY INFORMATION | STATE OF CHARGE | DEGREE OF BATTERY DETERIORATION | CHARGING CAPACITY | OPERATION SCHEDULE INFORMATION |
|---|---|---|---|---|---|---|

FIG. 3C

| CHARGER ID | POSITION INFORMATION | POWER SUPPLY CAPACITY | RESERVATION INFORMATION |
|---|---|---|---|

FIG. 3D

| ROAD LINK ID | GRADIENT INFORMATION | ROAD SURFACE INFORMATION |
|---|---|---|

FIG. 4

| | INITIAL CHARGER | OPERATION PLAN |
|---|---|---|
| FIRST VEHICLE | 60% | OPERATION SECTION — CHARGING — OPERATION SECTION<br>60　　　　30　　50　　　　20 |
| SECOND VEHICLE | 90% | OPERATION SECTION — CHARGING<br>90　　　　　50　　　　　90 |
| THIRD VEHICLE | 35% | CHARGING — OPERATION SECTION — CHARGING<br>35　90　　　　　　20　90 |
| FOURTH VEHICLE | 80% | OPERATION SECTION — CHARGING — OPERATION SECTION<br>80　　　　　45　65　　30 |

OPERATION PLANNING SYSTEM AND OPERATION PLANNING METHOD

CROSS-REFERENCE TO RELATED APPLICATION

This application claims priority to Japanese Patent Application No. 2020-208688 filed on Dec. 16, 2020, incorporated herein by reference in its entirety.

BACKGROUND

1. Technical Field

The present disclosure relates to a technique of receiving a reservation for operation of a vehicle from a user and creating an operation plan.

2. Description of Related Art

WO 2019/106745 discloses an on-demand traffic operation system that operates on-demand traffic in which vehicles are operated in response to a request from a user. The on-demand traffic operation system receives a schedule request from a passenger including a desired departure time, a desired arrival time, a departure location, and a destination and creates an allocation plan of on-demand traffic vehicles based on schedule requests which are collected until a prescribed time.

SUMMARY

A rechargeable vehicle with a rechargeable battery as a travel energy source may be charged in the process of operation depending on a state of charge thereof and is hindered in operation when several hours elapse for charging in a state in which a passenger is in the rechargeable vehicle.

The present disclosure provides a technique of preventing a vehicle from being delayed due to charging in the process of operation.

According to an aspect of the present disclosure, there is provided an operation planning system that creates an operation plan of a vehicle with a rechargeable battery as a travel energy source. The operation planning system including: a reception unit configured to receive request information including a departure location and a destination from a user; and an operation determining unit configured to determine an operation plan in response to the request information. The operation determining unit includes a section information deriving unit configured to derive an operation section of which a start point and an end point are determined from the request information, and an acquisition unit configured to acquire a state of charge of the rechargeable battery which is mounted in the vehicle. The operation determining unit is configured to derive a state of charge shortage by which is a shortage when the vehicle travels in the operation section based on the state of charge of the vehicle and to create the operation plan by allocating a vehicle, which is able to be charged with the derived state of charge shortage before the operation of the vehicle starts, to the operation section.

The operation determining unit may include a charging determining unit configured to determine a charging timing of the vehicle based on the state of charge of the vehicle. The charging determining unit may be configured to compare a plurality of vehicles in the state of charge and to create an operation plan in which the vehicle of which the state of charge is lower than those of the other vehicles is preferentially charged.

The operation planning system may further include a charger information storage unit configured to store position information of a plurality of chargers which is able to charge the rechargeable battery. The charging determining unit may be configured to determine the charger to be used out of the plurality of chargers based on the derived operation section and the position information of the chargers.

According to another aspect of the present disclosure, there is provided an operation planning method of creating an operation plan of a plurality of vehicles with a rechargeable battery as a travel energy source. The operation planning method includes: receiving request information including a departure location and a destination from a user; deriving an operation section from the request information; acquiring a state of charge of the rechargeable battery which is mounted in the vehicle; deriving a state of charge shortage by which there is a shortage when the vehicle travels in the operation section based on the state of charge of the vehicle; and creating the operation plan by allocating a vehicle, which is able to be charged with the derived state of charge shortage before the operation of the vehicle starts, to the operation section.

According to the aspects of the present disclosure, it is possible to provide a technique of preventing a vehicle from being delayed due to charging in the process of operation.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a diagram illustrating a functional configuration of the operation planning system according to the embodiment;

FIG. 3A is a diagram illustrating request information which is transmitted from a user terminal device, FIG. 3B is a diagram illustrating vehicle information which is transmitted from a vehicle management device, FIG. 3C is a diagram illustrating charger information which is transmitted from a charging service device, and FIG. 3D is a diagram illustrating travel environment information which is transmitted from an information providing device;

FIG. 4 is a diagram illustrating an operation plan which is created by the operation planning system according to a first embodiment;

DETAILED DESCRIPTION OF EMBODIMENTS

Figure 1:
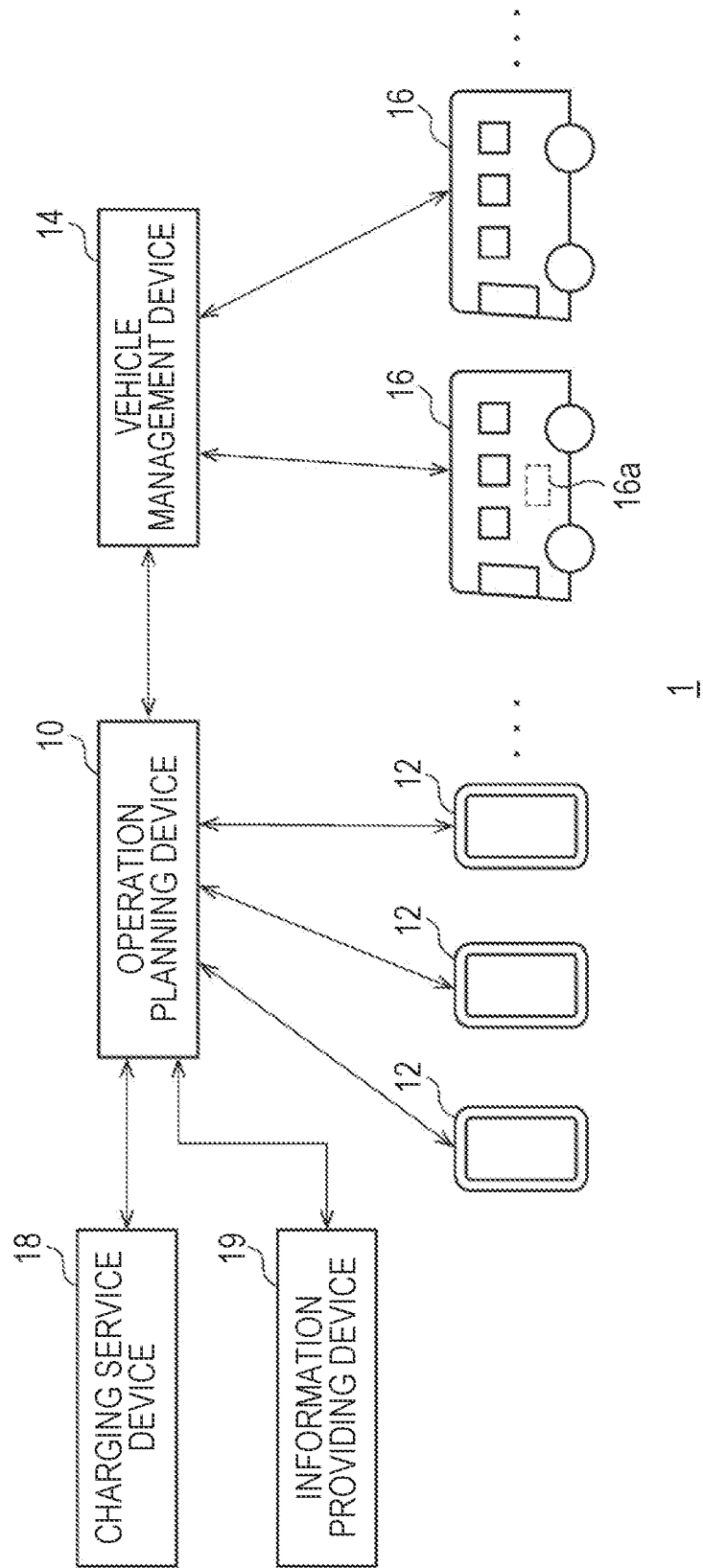
FIG. 1 is a diagram schematically illustrating an operation planning system according to an embodiment.

FIG. 1 is a diagram schematically illustrating an operation planning system 1 according to an embodiment. The operation planning system 1 includes an operation planning device 10, a user terminal device 12, a vehicle management device 14, a vehicle 16, a charging service device 18, and an information providing device 19. The operation planning system 1 receives a reservation for operation of a vehicle in on-demand traffic from a user and operates the vehicle 16 in response to a request to transport the user or the user's luggage. The vehicle 16 illustrated in FIG. 1 can be shared by a plurality of users. In FIG. 1, a bus is illustrated as the vehicle 16, but the present disclosure is not limited to this aspect and the vehicle 16 may be, for example, a small vehicle.

The user terminal device 12 can communicate with the operation planning device 10. A user requests the operation planning device 10 to operate a vehicle 16 using the user terminal device 12. The user terminal device 12 may be a mobile terminal device which is carried by each user and stores an application program for requesting operation of a vehicle 16. By executing the application program, the user terminal device 12 transmits request information to the operation planning device 10 and receives a reservation result indicating approval or disapproval of the request from the operation planning device 10.

Request information from a user is received until a predetermined reception deadline such as a day before an operation date or a predetermined time before an operation time. The operation planning device 10 creates an operation plan corresponding to an approved request and transmits the created operation plan to the vehicle management device 14.

The vehicle management device 14 manages the operations of the vehicles 16. The vehicle management device 14 can communicate with the operation planning device 10 and an onboard device of each vehicle 16, receives vehicle information including position information of each vehicle 16 from the vehicle 16, and transmits the received vehicle information to the operation planning device 10. The vehicle management device 14 receives an operation plan from the operation planning device 10 and manages each vehicle 16 such that the vehicle 16 travels in accordance with the operation plan. Each vehicle 16 may operate autonomously. The vehicles 16 include vehicle models in which a rechargeable battery 16*a* is mounted as a travel energy source. A plurality of rechargeable batteries 16*a* may be mounted in each vehicle 16.

The charging service device 18 provides a service of supplying electric power to a rechargeable vehicle, for example, an electric vehicle, in which a travel energy source can be charged from the outside. The charging service device 18 manages chargers which are installed in various places, ascertains positions or capacities of the chargers, and provides a charger reservation service. The charging service device 18 transmits charger information indicating positions or capacities of the chargers which are managed thereby to the operation planning device 10. The charging service device 18 receives a reservation for use of a charger from the operation planning device 10.

The information providing device 19 provides travel environment information to the operation planning device 10. The travel environment information includes temperature information and gradient information of roads. The information providing device 19 may be divided into a server device that provides temperature information and a server device that provides gradient information of roads.

There is a likelihood that a charging time of a rechargeable vehicle will be long and, for example, since a bus includes a rechargeable battery 16*a* with a large capacity, the charging time thereof may be up to about a maximum of 5 hours. The charging time can be shortened by quick charging, but there may be a vehicle 16 or a charger which cannot be charged by quick charging. In on-demand traffic, when a vehicle is charged in a state in which a user is in the vehicle, an arrival time may be excessively delayed. Accordingly, it is preferable that a state of charge of a rechargeable vehicle be managed. Therefore, the operation planning system 1 according to this embodiment creates an operation plan based on a state of charge, a battery capacity, or the like when a rechargeable vehicle operates. Accordingly, smooth operation is possible even when a rechargeable vehicle is used for on-demand traffic.

FIG. 2 illustrates a functional configuration of the operation planning system 1 according to this embodiment. In FIG. 2, elements indicated by functional blocks that perform various processes can be constituted by circuit blocks, a memory, an LSI, and the like in hardware and can be realized by a program or the like loaded into the memory in software. Accordingly, it will be understood by those skilled in the art that such functional blocks are realized in various forms by only hardware, only software, or a combination thereof, and the applicable embodiment is not limited to only one thereof.

The operation planning device 10 includes a communication unit 20, a vehicle information storage unit 24, a charger information storage unit 26, a reception unit 28, and an operation determining unit 30. The communication unit 20 can communicate with the user terminal device 12, the vehicle management device 14, the charging service device 18, and the information providing device 19 and transmits and receives information therewith.

The communication unit 20 acquires vehicle information from the vehicle management device 14, charger information from the charging service device 18, and travel environment information from the information providing device 19. The communication unit 20 may acquire the information at intervals of a predetermined cycle or acquire the information at the time at which the operation plan is created. The communication unit 20 acquires request information from the user terminal device 12 and the reception unit 28 receives request information. The information will be described below with new drawings.

FIG. 3A illustrates request information which is transmitted from the user terminal device 12, FIG. 3B illustrates vehicle information which is transmitted from the vehicle management device 14, FIG. 3C illustrates charger information which is transmitted from the charging service device 18, and FIG. 3D illustrates travel environment information which is transmitted from the information providing device 19.

The request information includes a user ID, departure location information, destination information, and desired date and time information. The departure location information and the destination information may be position information of preset stops or position information which is expressed by latitude and longitude. That is, a vehicle 16 in on-demand traffic may move between preset stops or move to an arbitrary position which is desired by a user. The desired date and time information may indicate one of a departure time and a departure time period and one of an arrival time and an arrival time period. The request information may include the number of occupants or may request to board a plurality of persons by one request.

The vehicle information illustrated in FIG. 3B includes a vehicle ID, position information, chargeability information, a state of charge, a degree of battery deterioration, a charging capacity, and operation schedule information. The position information, the chargeability information, the state of charge, the degree of battery deterioration, the charging capacity, and the operation schedule information are stored in correlation with the vehicle ID which is identification information of each vehicle. The vehicle information stored in the vehicle information storage unit 24 is updated at the time of creating an operation plan.

The position information of each vehicle is transmitted from an onboard device of the vehicle 16 to the vehicle management device 14. The chargeability information represents that the vehicle is a rechargeable vehicle of which a travel energy source can be charged or a fuel vehicle in which fuel is used as a travel energy source. The fuel vehicle includes a hybrid vehicle or a liquid-fuel vehicle. The rechargeable vehicle is a vehicle model which travels using only the rechargeable battery 16a and does not include a travel energy source other than a travel energy source being charged. The fuel vehicle is a vehicle which includes a travel energy source other than a rechargeable battery. The chargeability information has only to be information indicating that the vehicle is a rechargeable vehicle or a fuel vehicle and may be, for example, vehicle model information as long as it can be used to determine whether the vehicle is a rechargeable vehicle or a fuel vehicle based on the vehicle model information. A state of charge, a degree of battery deterioration, and a charging capacity may not be stored for the fuel vehicle.

The degree of battery deterioration represents a degree of deterioration of the rechargeable battery 16a which is mounted in a rechargeable vehicle. The degree of battery deterioration can be measured by an onboard device of each vehicle 16 or may be calculated by monitoring a current and a voltage in the process of charging or may be calculated by monitoring a battery residual capacity and a battery temperature. The degree of battery deterioration may be, for example, a rate of decrease of a maximum charging capacity of the rechargeable battery 16a and that the smaller the degree of deterioration of the rechargeable battery 16a becomes, the less the deterioration of the rechargeable battery 16a becomes. The state of charge represents an amount of electric power with which the rechargeable battery 16a is charged and may be, for example, a charging ratio with respect to a fully-charged state. The charging capacity represents a capacity of a charging connector into which a charging plug is inserted and represents a charging rate at which the rechargeable battery 16a is charged. The operation schedule information is information of an operation schedule of each vehicle 16 which is determined in advance by the operation planning device 10 or the like. The operation schedule information may include a user ID who has made a reservation. The vehicle information may include vehicle model information or a vehicle weight.

The charger information illustrated in FIG. 3C includes a charger ID, position information, a power supply capacity, and reservation information. The charger information represents information of chargers which are managed by the charging service device 18. The position information of each charger represents a position of a charging station in which the corresponding charger is installed. The power supply capacity of the charger represents a settable power supply output. The reservation information of the charger represents information indicating a reservation for use of the charger and includes a time period in which use of the charger is reserved.

The travel environment information illustrated in FIG. 3D is road information and includes a road link ID, gradient information, and road surface information. The road link ID represents a position of a road section. The gradient information represents a gradient of a road in a section corresponding to the road link ID and may be a value indicating a height difference. The road surface information represents a rolling resistance of a road surface of the section corresponding to the road link ID.

Description will continue with reference to FIG. 2. The vehicle information storage unit 24 stores the vehicle information transmitted from the vehicle management device 14. The charger information storage unit 26 stores the charger information transmitted from the charging service device 18.

The reception unit 28 receives request information including a departure location and a destination from a user. The reception unit 28 includes an approval determining unit 32 that derives a reservation result indicating whether a reservation in response to the received request information has been approved. The approval determining unit 32 derives a reservation result indicating whether a reservation in response to request information received until a predetermined deadline is approved or disapproved. The approval determining unit 32 performs determination of approval or disapproval, for example, such that the number of approved requests is maximized.

The operation determining unit 30 determines an operation plan of each vehicle 16 based on the approved request. The operation plan which is determined by the operation determining unit 30 is transmitted to the user terminal device 12 and the vehicle management device 14. The operation determining unit 30 includes an acquisition unit 33, a section information deriving unit 34, a charging determining unit 36, and a vehicle allocating unit 38. The acquisition unit 33 acquires vehicle information, charger information, and travel environment information.

The section information deriving unit 34 derives an operation section in which a start point and an end point are determined based on the request information. The section information deriving unit 34 may derive an operation section in which the departure location indicated by the request information is set as a start point and the destination is set as an end point. The section information deriving unit 34 generates section information indicating the operation section based on the request information. The section information includes a target departure time at which the corresponding vehicle departs from the start point and a target arrival time at which the vehicle arrives at the end point in addition to the start point and the end point of the operation section. The operation section indicated by the section information may define a travel route from the start point to the end point or the section information may include a scheduled travel distance of a travel route. The section information deriving unit 34 may generate one operation section based on a plurality of pieces of request information.

The charging determining unit 36 determines whether the corresponding vehicle 16 is to be charged in the operation plan. The charging determining unit 36 determines what charger is used to charge the vehicle 16 and at what time the vehicle 16 is to be charged based on the vehicle information and the charger information.

The vehicle allocating unit 38 determines what vehicle 16 is to be allocated to the request information, that is, the operation section derived by the section information deriving unit 34. The vehicle allocating unit 38 may store an allocation program for allocating a vehicle 16 and allocate a vehicle 16 by inputting the vehicle information and the section information to the allocation program. The allocation program may be a trained model using a technique such as a decision tree, a random forest, a logistic regression, or a neural network for the purpose of allowing a vehicle 16 to operate continuously. In this way, a charging schedule and a vehicle 16 are determined to be allocated to the operation section corresponding to the approved request information, and the operation plan is created. The operation plan may include a plurality of operation sections. Embodiments based on such a basic configuration will be described below.

First Embodiment

FIG. 4 is a diagram illustrating an operation plan which is created by an operation planning system 1 according to a first embodiment. All of first to fourth vehicles illustrated in FIG. 4 are rechargeable vehicles and travel using a rechargeable battery as a travel energy source, daily operation plans allocated to the first to fourth vehicles are illustrated, and the horizontal axis in each operation plan represents the same time. In FIG. 4, initial state of charge values of the first to fourth vehicles before they start their operation are illustrated and a change in state of charge is illustrated below each operation plan. In the operation sections illustrated in FIG. 4, the vehicles 16 travel continuously while allowing users to enter or exit the vehicles and are not charged while the vehicles are moving in each operation section, but can be charged between the operation sections.

A state of charge of a rechargeable battery 16a which is mounted in a rechargeable vehicle is managed to be kept equal to or greater than a predetermined threshold value, for example, equal to or greater than 20%. The state of charge is managed such that it does not reach 100%, that is, such that it is equal to or less than 90%, in principle, and the rechargeable battery can be charged to 100% when it is required for operation.

The first vehicle starts its operation at an initial state of charge of 60% and the state of charge thereof decreases to 30% in a first operation section. Then, the first vehicle restores the state of charge to 50% by charging and starts second operation, and the state of charge decreases to 20% in the second operation section. Accordingly, an operation plan in which the state of charge is kept equal to or greater than a predetermined threshold value can be executed.

In the operation plan of the first vehicle, charging is scheduled between the first and second operation sections, and the charging schedule is not to increase the state of charge to 100% but to increase the state of charge by a minimum value required for the second operation. Accordingly, it is possible to perform the next operation immediately after shortening the charging time.

A process of incorporating a charging schedule into the operation plan of the first vehicle will be described below. The section information deriving unit 34 derives scheduled travel distances of the first and second operation sections, and the charging determining unit 36 derives first energy consumption in the first operation section and second energy consumption in the second operation section, derives a state of charge shortage by subtracting the first energy consumption and the second energy consumption from the state of charge of the first vehicle, and determines whether a charging schedule is necessary for the first vehicle. The charging determining unit 36 derives the state of charge shortage for each operation section and determines whether charging is necessary until the corresponding operation section.

In this way, the state of charge shortage is derived by subtracting the state of charge of the vehicle 16 from energy consumption when the vehicle travels the scheduled travel distance. The state of charge of the rechargeable battery 16a may be determined to be short when the state of charge is equal to or less than a predetermined threshold value and the state of charge shortage may be an amount which is short of the predetermined threshold value. That is, the state of charge shortage may be calculated by subtracting the state of charge of the rechargeable battery 16a from a sum of estimated energy consumption and the predetermined threshold value. The energy consumption may be derived for each vehicle or for each vehicle model. The charging determining unit 36 derives the state of charge shortage in the second operation section based on the state of charge which has decreased in the first operation section. The state of charge which has decreased in the first operation section is stored in the memory. When the state of charge shortage in the second operation section is derived, the acquisition unit 33 acquires the state of charge which has decreased in the first operation section and the charging determining unit 36 derives the state of charge shortage based on the acquired state of charge and the energy consumption in the second operation section.

The state of charge shortage may be a minimum amount in which the state of charge is estimated not to be equal to or less than at least the predetermined threshold value during operation, and the charging determining unit 36 may determine that the rechargeable battery is to be charged with only the state of charge shortage. When the rechargeable battery is charged with the state of charge shortage and the state of charge is equal to or less than a predetermined upper limit value, for example, 80%, the charging determining unit 36 may charge the rechargeable battery with a sum of the state of charge shortage and a predetermined amount. The charging determining unit 36 may determine an amount of electric power with which the rechargeable battery 16a is charged such that the state of charge when the vehicle completes traveling in the operation section is equal to or greater than a predetermined threshold value and equal to or less than a predetermined reference value, for example, 50%.

The state of charge shortage may be a charging ratio of the rechargeable battery or may be a numerical value obtained by converting the charging ratio to a charging time. The charging determining unit 36 can derive a charging time required for charging the rechargeable battery with the state of charge shortage based on the charging capacity of the rechargeable battery 16a and the power supply capacity of the charger.

The charging determining unit 36 determines whether a state of charge is short for each operation section and receives the state of charge estimated for each operation section from the acquisition unit 33. The charging determining unit 36 derives the energy consumption values in the first and second operation sections, derives that the state of charge of the first vehicle becomes 30% by traveling in the first operation section, and stores that state of charge in the memory. The acquisition unit 33 acquires the state of charge of 30% in the first operation section from the memory. The charging determining unit 36 derives the state of charge shortage in the second operation section based on the state of charge of 30%. Accordingly, the charging determining unit 36 determines that the state of charge is short due to traveling in the second operation section and determines that the rechargeable battery is to be charged with the state of charge shortage until the operation in the second operation section is started. The vehicle allocating unit 38 allocates a first vehicle which can be charged with the state of charge shortage until the operation in an operation section is started to the operation section based on the derived state of charge shortage. In this way, the operation determining unit 30 allocates a vehicle 16 which can be charged with the state of charge shortage until the operation in the operation section is started to the operation section and creates an operation plan.

Since an operation plan for a vehicle which needs to be charged for operation can be created based on a state of charge shortage, the vehicle can operate without being charged in the process of operation by charging the vehicle with the state of charge shortage. Since a rechargeable battery is charged with minimum electric power required for operation and an operation plan is created, it is possible to save a time required for full charging and it is easy to receive a request. Since energy efficiency of a vehicle 16 is high when the vehicle operates continuously with a heated travel energy source, an operation plan in which the vehicle operates continuously can be created.

In the operation plan of the second vehicle, the operation is started with an initial state of charge of 90%, and the state of charge is decreased to 50% in the operation and is then restored to 90% by charging.

In the operation plan of the third vehicle, the operation is started with an initial state of charge of 35%, charging is first performed to increase the state of charge to 90%, the state of charge is decreased to 20% in the operation and is then restored to 90% by charging. Charging of the third vehicle is scheduled in the nighttime in which a charging fee is low. Since the number of times of charging is decreased and an operation for avoiding full charging is planned, a vehicle 16 with a low initial state of charge remains in the day before.

In the operation plan of the fourth vehicle, the operation is started with an initial state of charge of 80%, the state of charge is decreased to 45% in the first operation, and charging is necessary for the second operation. Since the state of charge of the fourth vehicle is lower than that of the second vehicle, an operation plan in which a charger can be preferentially used for the fourth vehicle is created. Accordingly, a charging schedule in which the second vehicle waits until charging of the fourth vehicle ends or moves to another charging station is created for the second vehicle.

The charging determining unit 36 determines a charger and a charging timing based on the state of charge of a vehicle 16 and determines an operation plan in which a vehicle 16 with a lower state of charge than those of other vehicles 16 is preferentially charged by comparing the state of charge values of a plurality of vehicles 16 at the time of charging. The state of charge values of the plurality of vehicles 16 which are compared may be amounts which have changed due to traveling in operation sections or may be, for example, state of charge values at a timing at which the operation of a certain vehicle 16 has ended. Accordingly, by preferentially charging a vehicle 16 with a lower state of charge, the state of charge is less likely to be equal to or less than a predetermined threshold value. The vehicles 16 of which the state of charge values are compared are vehicles 16 which do not have a travel schedule in an operation section or a charging schedule.

The charging determining unit 36 determines which charger out of a plurality of chargers is to be used in an operation plan based on the state of charge of a vehicle 16, section information derived by the section information deriving unit 34, and position information of chargers. Accordingly, the charging determining unit 36 can select a charger near a departure location or a destination and determine a suitable charging timing based on the state of charge.

When charging is necessary for operation of a vehicle 16, the charging determining unit 36 may generate use request information for reserving use of a charger and transmit reservation request information to the charging service device 18 to reserve use of a charger. The use request information includes a charger ID which is reserved, a use start time, and a use end time. The charging determining unit 36 generates the use request information to avoid time periods which have been already reserved with reference to reservation information of the charger included in the charger information acquired from the charging service device 18. By reserving a charger, it is possible to efficiently use the charger to avoid charging congestion and to smoothly perform a subsequent operation.

Figure 5:
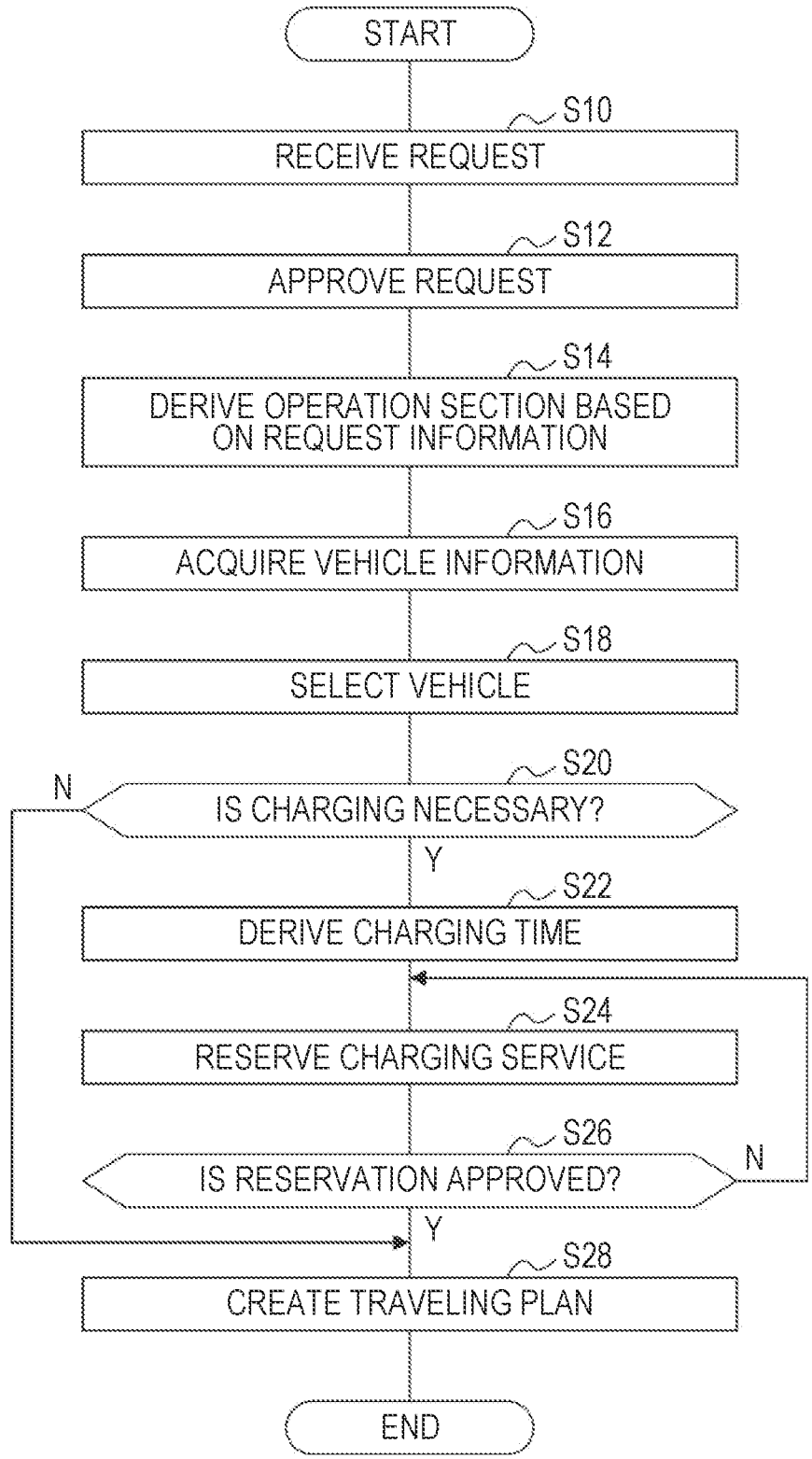
FIG. 5 is a flowchart illustrating an operation plan creating process which is performed by an operation planning device according to the first embodiment.

FIG. 5 is a flowchart illustrating an operation plan creating process which is performed by the operation planning device 10 according to the first embodiment. The reception unit 28 of the operation planning device 10 receives request information from a user terminal device 12 until a predetermined deadline (S10), and the approval determining unit 32 determines whether the request is approved (S12). When the request is not approved, this process ends.

The section information deriving unit 34 of the operation determining unit 30 derives section information based on the approved request information (S14). The acquisition unit 33 acquires vehicle information from the vehicle management device 14 (S16). The vehicle information includes a state of charge of the rechargeable battery 16a.

The vehicle allocating unit 38 selects a vehicle which can operate in response to the request information using an allocation program (S18), and the charging determining unit 36 derives a state of charge shortage when the vehicle operates in an operation section based on the state of charge of the selected vehicle and the section information, and determines whether charging is necessary based on the derived state of charge shortage (S20). When charging of the selected vehicle is not necessary (N in S20), the vehicle allocating unit 38 determines that the selected vehicle is to be allocated and creates an operation plan (S28).

When charging of the selected vehicle is necessary (Y in S20), the charging determining unit 36 derives a charging time when the vehicle would operate based on the scheduled travel distance and the state of charge, and determines that the vehicle is to be charged before the vehicle starts its operation (S22). The charging determining unit 36 selects a charger to be used based on the derived section information and the position information of the charger, generates use request information of the selected charger, and transmits the generated use request information to the charging service device 18 (S24). When the reservation for use of the charger is not approved (N in S26), the charging determining unit 36 requests use of another charger (S24).

When the reservation for use of the charger is approved (Y in S26), the vehicle selected by the vehicle allocating unit 38 is allocated to the operation in response to the request and an operation plan is created (S28). In this way, since the operation planning device 10 incorporates a charging schedule into an operation plan of a vehicle, it is possible to charge the vehicle with a state of charge shortage until the vehicle starts its operation and to prevent the rechargeable battery from being completely discharged during the operation.

Second Embodiment

Figure 6:
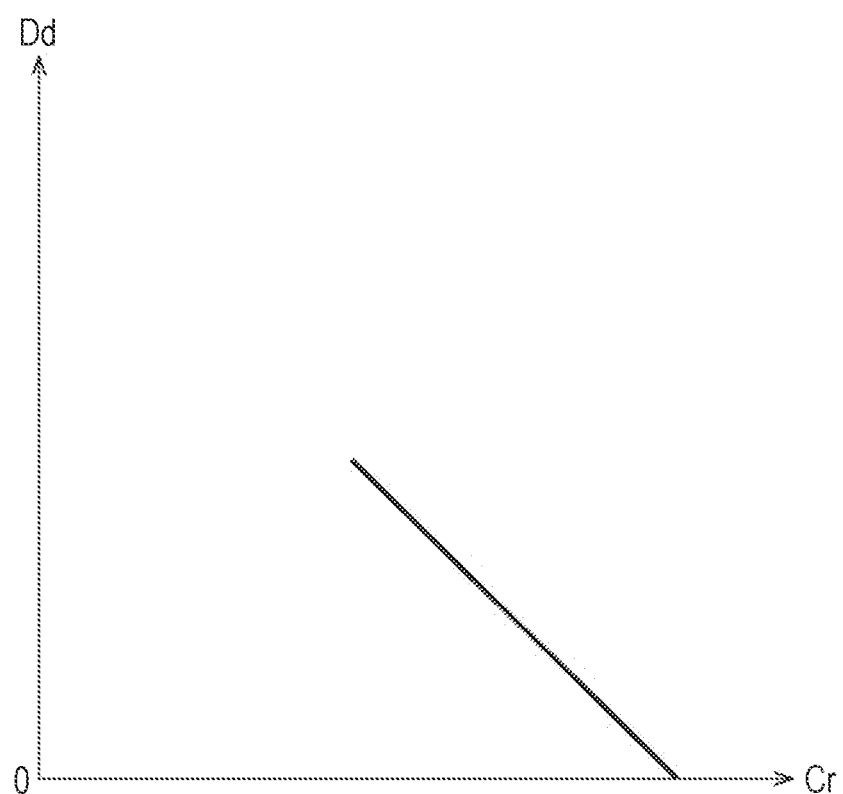
FIG. 6 is a diagram illustrating a relationship between a degree of battery deterioration of an onboard rechargeable battery and a cruising range.

FIG. 6 is a diagram illustrating a relationship between a degree of battery deterioration of an onboard rechargeable battery 16a and a cruising range. In FIG. 6, the vertical axis represents the degree of battery deterioration Dd, and the horizontal axis represents the cruising range Cr in a fully charged state. When the degree of battery deterioration Dd reaches a predetermined value, the rechargeable battery 16a is exchanged.

As illustrated in FIG. 6, as the degree of battery deterioration Dd increases, the cruising range Cr decreases. Accordingly, when a vehicle 16 performs its operation with a long scheduled travel distance, the state of charge may become equal to or less than a predetermined threshold value depending on the degree of battery deterioration Dd of the rechargeable battery 16a discharged during the operation.

Therefore, the operation planning device 10 according to the second embodiment preferentially allocates a fuel vehicle rather than a rechargeable vehicle to an operation section in which the scheduled travel distance is equal to or greater than a predetermined distance. The vehicle allocating unit 38 determines which vehicle 16 of a rechargeable vehicle and a fuel vehicle is to be allocated to an operation section based on the scheduled travel distance of the operation section. The fuel vehicle has vehicle characteristics that a travel distance is longer and an energy charging time is shorter in comparison with a rechargeable vehicle. By selecting a vehicle to be allocated based on chargeability information, appropriate vehicle allocation corresponding to vehicle characteristics can be performed for a scheduled travel distance. When the scheduled travel distance is equal to or greater than a predetermined distance, for example, 80 km, it may be determined to be a long distance.

The vehicle allocating unit 38 preferentially allocates a vehicle 16 with a relatively low degree of battery deterioration to an operation section in which the scheduled travel distance is equal to or greater than the predetermined distance in allocating a rechargeable vehicle. That is, the vehicle allocating unit 38 preferentially allocates a vehicle in which the degree of battery deterioration of the rechargeable battery 16a is lower than those of other vehicles to an operation section in which the scheduled travel distance is equal to or greater than the predetermined distance. The vehicle allocating unit 38 determines allocation of a vehicle 16 to an operation section based on the scheduled travel distance of the operation section and the degree of battery deterioration. Allocation of a vehicle suitable for the scheduled travel distance can be performed by selecting a vehicle to be allocated based on the degree of battery deterioration of the rechargeable battery 16a. A vehicle in which a cruising range in a fully charged state is longer can be allocated to an operation section in which the scheduled travel distance is longer.

The charging determining unit 36 derives a charging time required for the rechargeable battery 16a based on the scheduled travel distance of an operation section, and the vehicle allocating unit 38 determines allocation of a vehicle 16 to the operation section based on the charging time of the rechargeable battery 16a. The charging determining unit 36 derives energy consumption from the scheduled travel distance, derives a state of charge shortage for travel based on the energy consumption and the state of charge, and derives a charging time for securing the state of charge shortage. The vehicle allocating unit 38 allocates a vehicle 16 in which the charging time can be secured before its operation based on the derived charging time. The operation determining unit 30 creates an operation plan such that the state of charge of the vehicle 16 is not equal to or less than a predetermined threshold value in the operation. Accordingly, a vehicle 16 of which the state of charge is estimated to be equal to or less than the predetermined threshold value in the operation is charged until the operation in the operation section is started.

A vehicle 16 in which the charging time cannot be secured until the operation is started is not allocated to the operation. Accordingly, it is possible to secure a state of charge required for an operation and to allocate a vehicle 16.

Figure 7:
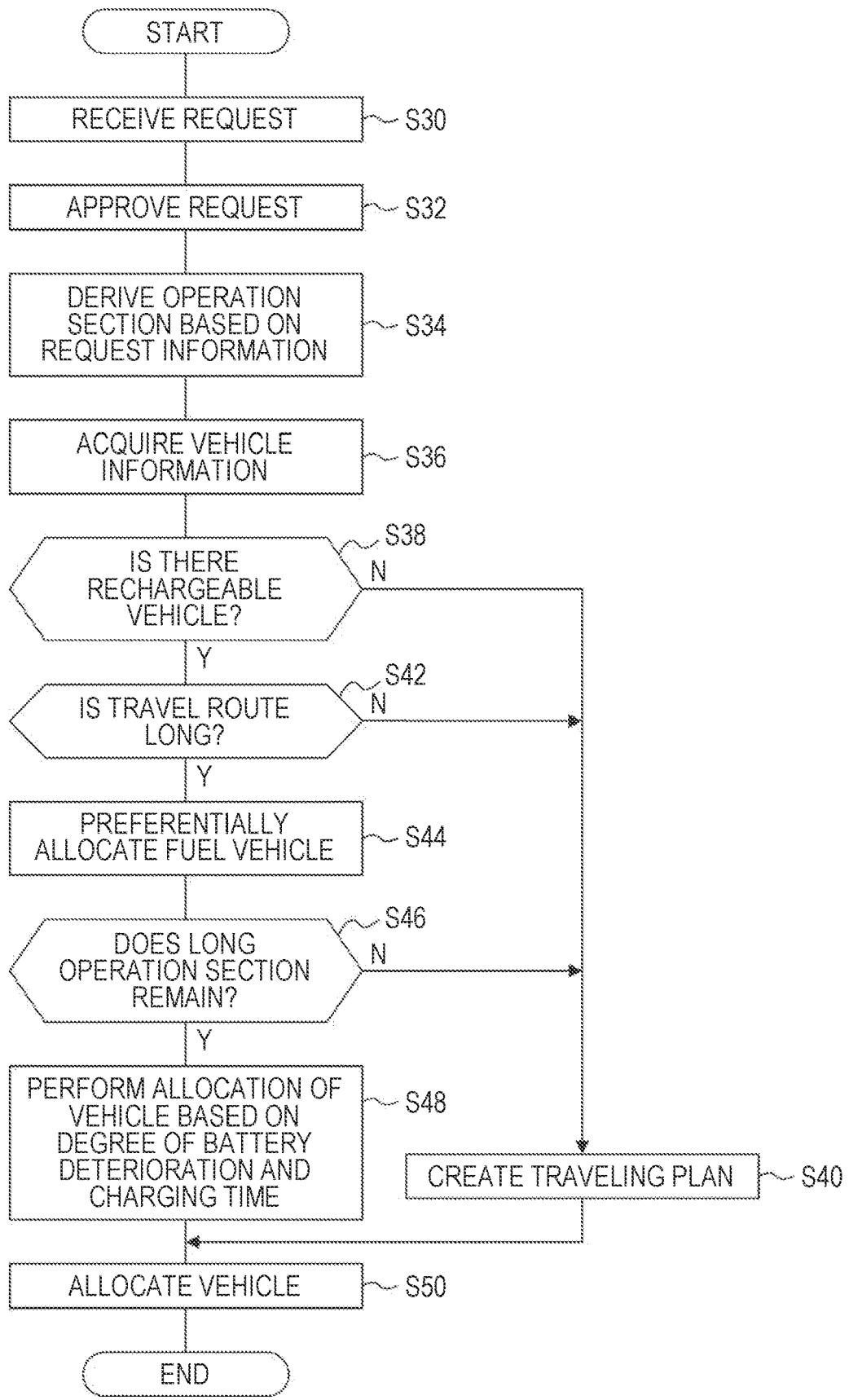
FIG. 7 is a flowchart illustrating an operation plan creating process which is performed by an operation planning device according to a second embodiment.

FIG. 7 is a flowchart illustrating an operation plan creating process which is performed by the operation planning device 10 according to the second embodiment. The reception unit 28 of the operation planning device 10 receives request information from a user terminal device 12 until a predetermined deadline (S30), and the approval determining unit 32 determines whether the request is approved (S32). When the request is not approved, this process ends.

The section information deriving unit 34 of the operation determining unit 30 derives the operation section n based on the approved request information (S34). The acquisition unit 33 acquires vehicle information from the vehicle management device 14 (S36).

The charging determining unit 36 determines whether there is a rechargeable vehicle as a vehicle 16 which can operate (S38). When there is no rechargeable vehicle (N in S38), the vehicle allocating unit 38 determines allocation of a vehicle 16 in response to the request information based on the operation section and the vehicle information (S40), and creates an operation plan (S50).

There is a rechargeable vehicle (Y in S38), the vehicle allocating unit 38 determines whether a scheduled travel distance of the operation section is a long distance equal to or greater than a predetermined distance (S42). When the scheduled travel distance is not a long distance (N in S42), the vehicle allocating unit 38 determines allocation of a vehicle 16 in response to the request information without any particular limit (S40) and creates an operation plan (S50).

When the scheduled travel distance is a long distance (Y in S42), the vehicle allocating unit 38 more preferentially allocates a fuel vehicle to the request of the long distance than a rechargeable vehicle (S44). In order to cope with a case in which there is no fuel vehicle or there is a plurality of requests of a long distance, the vehicle allocating unit 38 determines whether an operation section of a long distance remains (S46). When an operation section of a long distance does not remain (N in S46), the vehicle allocating unit 38 allocates a vehicle 16 to the other requests using a predetermined allocation program (S40) and creates an operation plan (S50).

When an operation section of a long distance remains (Y in S46), the vehicle allocating unit 38 allocates a vehicle 16 based on a degree of battery deterioration (S48) and creates an operation plan (S50). A vehicle 16 with a low degree of battery deterioration is preferentially allocated to the operation section of a long distance.

Third Embodiment

A vehicle 16 which is used in an operation planning system 1 according to a third embodiment is a rechargeable vehicle of which a travel energy source can be charged. Energy consumption of an onboard rechargeable battery 16a changes greatly depending on a height difference of a road, whether an air conditioner is used, a temperature of a rechargeable battery, or the like as well as a travel distance. Therefore, an operation planning device 10 according to the third embodiment creates an operation plan based on travel environment information when a vehicle travels in an operation section. The travel environment information includes road gradient information, temperature information which is a forecast on a scheduled travel day, and travel environment information in the past. Since energy consumption can be derived based on the travel environment information, it is possible to accurately derive energy consumption of a rechargeable battery when a vehicle travels a scheduled travel distance.

Description with reference to FIG. 2 will be continued. The charging determining unit 36 derives energy consumption when a vehicle 16 would travel in an operation section based on a scheduled travel distance of the operation section derived by the section information deriving unit 34 and travel environment information of the operation section. The section information deriving unit 34 in the third embodiment derives an operation section in which a travel route is determined. The charging determining unit 36 derives reference energy consumption based on the scheduled travel distance and a vehicle weight, and derives energy consumption by correcting the derived reference energy consumption using a height difference of a road, whether an air conditioner is used, temperature information, and the like. A map which is prepared by experiment or the like ma be used for this deriving. The energy consumption is derived for each vehicle or for each vehicle model. The charging determining unit 36 calculates a state of charge shortage based on the derived energy consumption and the state of charge of the vehicle 16. The state of charge shortage is derived by subtracting the state of charge of the vehicle 16 from the energy consumption of the operation section. The charging determining unit 36 may derive a charging time shortage required for travel in the operation section based on the state of charge shortage.

The vehicle allocating unit 38 allocates a vehicle 16 which can secure the derived energy consumption until its operation in the operation section is started to the operation section and creates an operation plan. The vehicle allocating unit 38 may allocate a vehicle 16 which can be charged with the derived state of charge shortage before its operation is started to the operation section. The operation plan includes a schedule in which the vehicle 16 is scheduled to be fully charged with the state of charge shortage before the operation is started. Accordingly, since energy consumption can be accurately derived based on travel environment information of an operation section and an operation plan can be created based on the premise that the energy consumption is secured, it is possible to prevent the state of charge from becoming equal to or less than a predetermined threshold value in operation and to allow a vehicle to smoothly operate.

In a downhill road in which a road gradient of an operation section is large, there is a likelihood that the state of charge will increase. When the charging determining unit 36 estimates that the state of charge increases due to the operation, the vehicle allocating unit 38 may assign the state of charge estimated to increase to the next operation. The energy consumption of the air conditioner may be derived with reference to energy consumption of the air conditioner in the past from a drive record. A map representing a relationship between energy consumption of the air conditioner and the outside air temperature may be stored.

The operation determining unit 30 derives a prohibited time period in which charging of the rechargeable battery 16a is prohibited based on the temperature information of a desired date and time in a request, and determines an operation plan in which charging is not performed in the derived prohibited time period. Charging of the rechargeable battery 16a is prohibited by a function of an onboard device when an ambient temperature is equal to or lower than a predetermined low temperature or equal to or higher than a predetermined high temperature. The predetermined low temperature is, for example, zero degrees and the predetermined high temperature is, for example, 50 degrees. Accordingly, depending on the ambient temperature of the rechargeable battery 16a, charging may not be performed even when the rechargeable battery 16a is intended to charge through connection to a charger.

The past travel environment information may be used to derive a charging-prohibited time period. For example, when a detection result from a temperature sensor which is provided in the rechargeable battery 16a from 13:00 to 15:00 is equal to or higher than the predetermined high temperature with reference to a past travel history recorded in a drive recorder and the temperature on the scheduled travel day is the same as the past temperature, the charging determining unit 36 derives the charging-prohibited time period as ranging from 13:00 to 15:00. For example, when the temperature is equal to or lower than 35 degrees, the ambient temperature of the rechargeable battery 16a is equal to or higher than the predetermined high temperature and thus the charging determining unit 36 may derive the charging-prohibited time period. The charging determining unit 36 derives the charging-prohibited time period based on the temperature information and the vehicle allocating unit 38 determines allocation of a vehicle 16 which can be charged with a state of charge shortage before its operation is started to avoid the charging-prohibited time period. Accordingly, it is possible to create an operation plan in which the rechargeable battery 16a is charged to avoid the charging-prohibited time period by the function of the vehicle 16 side.

Figure 8:
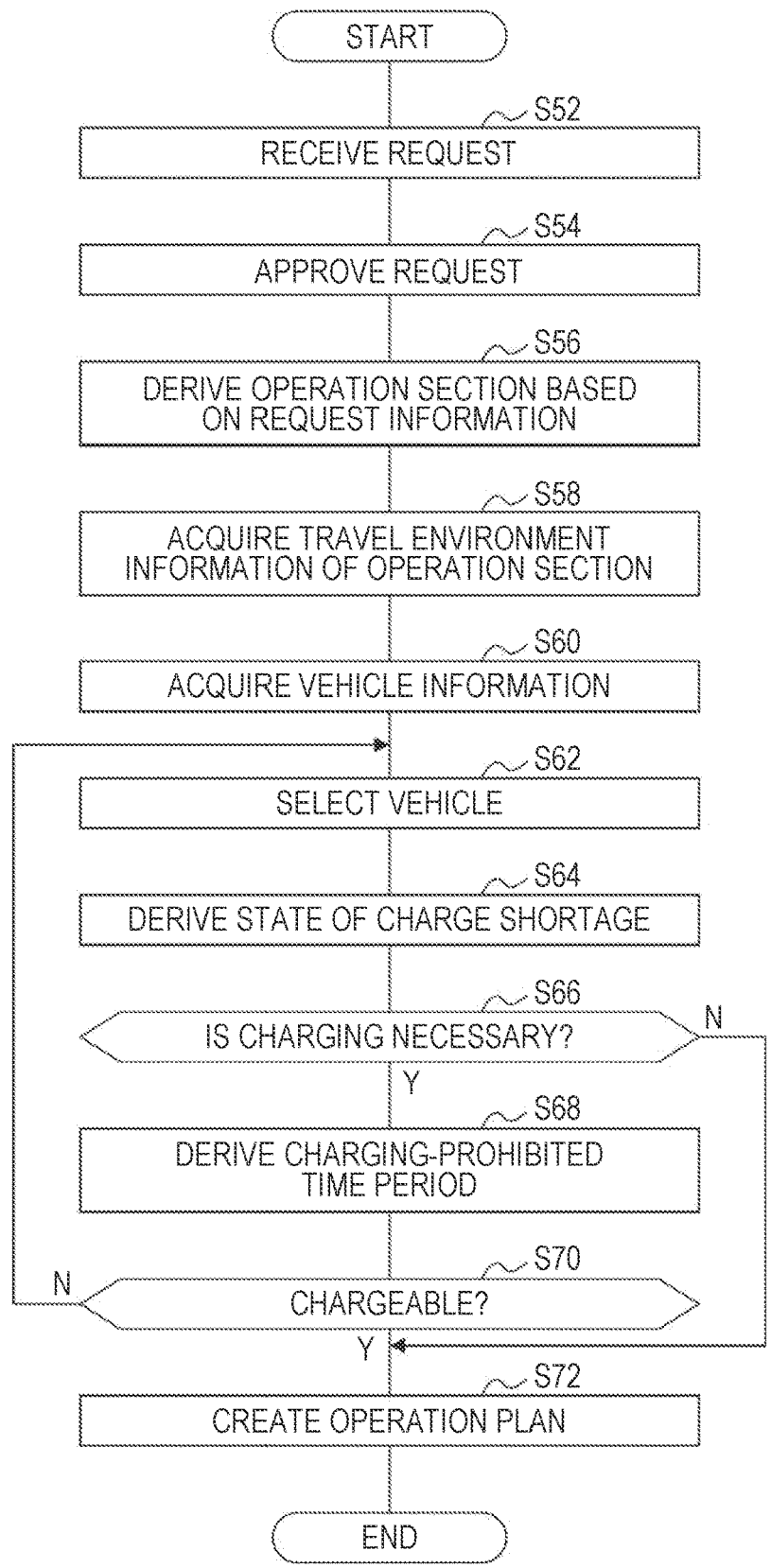
FIG. 8 is a flowchart illustrating an operation plan creating process which is performed by an operation planning device according to a third embodiment.

FIG. 8 is a flowchart illustrating an operation plan creating process which is performed by the operation planning device 10 according to the third embodiment. The reception unit 28 of the operation planning device 10 receives request information from a user terminal device 12 until a predetermined deadline (S52), and the approval determining unit 32 determines whether the request is approved (S54). When the request is not approved, this process ends.

The section information deriving unit 34 of the operation determining unit 30 derives section information based on the approved request information (S56). The acquisition unit 33 acquires travel environment information of the operation section from the information providing device 19 (S58). The acquisition unit 33 acquires vehicle information from the vehicle management device 14 (S60).

The vehicle allocating unit 38 selects a vehicle 16 for the operation section using an allocation program (S62), and the charging determining unit 36 derives energy consumption when the vehicle would travel a scheduled travel distance of the operation section using the travel environment information and derives a state of charge shortage when the selected vehicle 16 would travel (S64). The charging determining unit 36 determines whether charging is necessary based on the derived state of charge shortage (S66). When the selected vehicle 16 does not require charging for its operation (N in S66), the vehicle allocating unit 38 determines allocation of the selected vehicle and creates an operation plan (S72).

When the selected vehicle 16 requires charging for the operation (Y in S66), the charging determining unit 36 derives a charging-prohibited time period based on the temperature information of a scheduled travel day (S68). The charging determining unit 36 determines whether the selected vehicle 16 can be charged with the state of charge shortage before the operation is started (S70). When the selected vehicle 16 cannot be charged (N in S70), the vehicle allocating unit 38 retrieves a vehicle 16 with a sufficient state of charge to select a new vehicle 16 (S62).

When the selected vehicle 16 can be charged (Y in S70), the vehicle allocating unit 38 allocates the selected vehicle 16 to its operation and creates an operation plan (S72). In this way, by creating a charging schedule based on the travel environment of an operation section and incorporating the charging schedule into the operation plan, it is possible to enable an operation without congestion.

The aforementioned embodiments are merely exemplary and it will be understood by those skilled in the art that a combination of various elements can be modified in various forms and such modifications are included in the scope of the present disclosure.

For example, the aspect in which the operation determining unit 30 makes a reservation for use of a charger according to the first embodiment may be incorporated into the operation planning processes according to the second embodiment and the third embodiment. The aspect in which the operation determining unit 30 allocates a fuel vehicle to a request in which a scheduled travel distance is equal to or greater than a predetermined distance with higher priority than that of a rechargeable vehicle according to the second embodiment may be incorporated into the operation planning processes according to the first embodiment and the third embodiment. The aspect in which the operation determining unit 30 derives energy consumption of an operation section using travel environment information according to the third embodiment may be incorporated into the operation planning processes according to the first embodiment and the second embodiment.

What is claimed is:

1. An operation planning system that creates an operation plan for each of a plurality of vehicles that autonomously travel, wherein the plurality of vehicles include a rechargeable vehicle with a rechargeable battery as a travel energy source and a fuel vehicle which includes other than the rechargeable battery as the travel energy source, the operation planning system comprising:
    a vehicle management device configured to manage operations of the plurality of vehicles;
    an operation planning device comprising:
        a communication unit configured to communicate with the vehicle management device;
        a reception unit configured to receive request information including a departure location and a destination from a user terminal device of a user via the communication unit;
        an operation determining unit configured to create an operation plan in response to the request information, wherein the operation plan includes an operation section and a charging section, wherein the charging section is a charging schedule which does not occur at a same time as the operation section of the operation plan;
    wherein the operation determining unit includes
        a section information deriving unit configured to derive the operation section of the operation plan based on the request information, wherein the operation section includes the departure point as a start point and the destination as an end point, and a scheduled travel distance from the start point to the end point, and
        an acquisition unit configured to acquire a state of charge of the rechargeable battery which is mounted in the rechargeable vehicle, and
    wherein the operation determining unit is configured to:
        derive a state of charge shortage before the rechargeable vehicle starts the operation section, wherein the state of charge shortage is an estimated shortage of the rechargeable battery of the rechargeable vehicle to complete travel in the operation section, based on the acquired state of charge of the rechargeable vehicle, wherein the charge section allows the rechargeable battery to be charged an amount of the estimated shortage;
        create the operation plan by allocating the rechargeable vehicle to the operation section, based on the rechargeable vehicle being able to be charged with the derived state of charge shortage before the operation of the rechargeable vehicle starts; and
        create the operation plan by allocating the fuel vehicle, rather than the rechargeable vehicle, to the operation section, when the scheduled travel distance is equal to or greater than a predetermined distance;
    wherein the operation planning device is configured to transmit the operation plan to the vehicle management device using the communication unit,
    wherein the vehicle management device automatically communicates with an onboard vehicle device of each of the plurality of vehicles and controls the allocated rechargeable vehicle or the allocated fuel vehicle to automatically travel autonomously in accordance with the operation plan.

2. The operation planning system according to claim 1, wherein the operation determining unit includes a charging determining unit configured to determine a charging timing of the rechargeable vehicle based on the state of charge of the rechargeable vehicle, and
    wherein the charging determining unit is configured to compare a plurality of rechargeable vehicles in the state of charge and to create an operation plan in which the rechargeable vehicle of which the state of charge is lower than those of the other rechargeable vehicles is preferentially charged.

3. The operation planning system according to claim 2, further comprising a charging information storage unit configured to store position information of a plurality of chargers which is able to charge the rechargeable battery,
    wherein the charging determining unit is configured to determine the charger to be used out of the plurality of chargers based on the derived operation section and the position information of the chargers.

4. The operation planning system according to claim 1, wherein the rechargeable vehicle is one of a plurality of rechargeable vehicles, and the operation determining unit preferentially allocates a rechargeable vehicle from among the plurality of rechargeable vehicles, which has a lowest degree of battery deterioration, to the operation section when the scheduled travel distance is equal to or greater than the predetermined distance.

5. The operation planning system according to claim 1, wherein:
    the operation section is one of at least two operation sections in the operation plan,
    before the allocated rechargeable vehicle or the allocated fuel vehicle starts to travel autonomously in accordance with the operation plan, the state of charge shortage is additionally derived based on travel environment information of a scheduled travel route of each of the two operation sections in the operation plan, and the charging section is scheduled between the two operation sections in the operation plan.

6. The operation planning system according to claim 1, wherein the charging section is one of at least two charging sections in the operation plan, before the allocated rechargeable vehicle or the allocated fuel vehicle starts to travel autonomously in accordance with the operation plan, the state of charge shortage is additionally derived based on travel environment information of a scheduled travel route of the operation section in the operation plan, and the operation section is scheduled between the two charging sections in the operation plan.

7. An operation planning method of creating an operation plan for each of a plurality of vehicles that autonomously travel, wherein the plurality of vehicles include a rechargeable vehicle with a rechargeable battery as a travel energy source and a fuel vehicle which includes other than the rechargeable battery as the travel energy source, the operation planning method comprising:

receiving request information including a departure location and a destination from a user terminal device of a user via a communication unit;

deriving an operation plan based on the request information, wherein the operation plan includes an operation section and a charging section, wherein the charging section is a charging schedule which does not occur at a same time as the operation section of the operation plan, wherein the operation section includes the departure location as a start point and the destination as an end point, and a scheduled travel distance from the start point to the end point of the operation section;

acquiring a state of charge of the rechargeable battery which is mounted in the rechargeable vehicle;

deriving a state of charge shortage before the rechargeable vehicle starts the operation section, wherein the state of charge shortage is an estimated shortage of the rechargeable battery of the rechargeable vehicle to complete travel in the operation section, based on the acquired state of charge of the rechargeable vehicle, wherein the charge section allows the rechargeable battery to be charged an amount of the estimated shortage; and creating the operation plan by allocating the rechargeable vehicle to the operation section, based on the rechargeable vehicle being able to be charged with the derived state of charge shortage before the operation of the rechargeable vehicle starts;

creating the operation plan by allocating the fuel vehicle rather than the rechargeable vehicle, to the operation section, when the scheduled travel distance is equal to or greater than a predetermined distance; and transmitting, using the communication unit, the operation plan automatically to an onboard vehicle device of the allocated rechargeable vehicle or the allocated fuel vehicle so as to control the allocated rechargeable vehicle or the allocated fuel vehicle to automatically travel autonomously in accordance with the operation plan.

* * * * *